United States Patent [19]

van der Lely

[11] 4,270,621
[45] Jun. 2, 1981

[54] ARTICULATED TRACTOR POWERED BY TANDEM ENGINES

[76] Inventor: Cornelis van der Lely, 7, Brüschenrain, Zug, Switzerland

[21] Appl. No.: 4,188

[22] Filed: Jan. 17, 1979

Related U.S. Application Data

[62] Division of Ser. No. 703,652, Jul. 8, 1976, Pat. No. 4,181,315.

[30] Foreign Application Priority Data

Jul. 8, 1975 [NL] Netherlands .......................... 7508091

[51] Int. Cl.$^3$ .......................... B60K 15/08; B60K 5/08
[52] U.S. Cl. .................................. 180/54 C; 180/314; 180/329; 180/900; 280/5 A
[58] Field of Search .............. 280/5 A, 5 R, 5 F, 5 C, 280/5 D, 5 E; 180/54 C, 54 A, 77 P, 77 N, 77 M, 235, 265, 900

[56] References Cited

U.S. PATENT DOCUMENTS

| | | | |
|---|---|---|---|
| 1,177,007 | 3/1916 | Auerbacher | 280/5 A |
| 1,329,998 | 2/1920 | Palmer | 280/5 A |
| 1,415,122 | 5/1922 | Schofield | 280/5 A |
| 3,006,358 | 10/1961 | Hildebrandt | 280/5 A |
| 3,051,502 | 8/1962 | Webster | 280/5 F |
| 3,195,913 | 7/1965 | Hallsworth | 180/77 P |
| 3,633,609 | 1/1972 | Benner | 280/5 A |
| 3,645,349 | 2/1972 | Nichter | 280/5 R |
| 3,690,395 | 9/1972 | Spiller | 280/5 A |

FOREIGN PATENT DOCUMENTS

| | | | |
|---|---|---|---|
| 237765 | 8/1959 | Australia | 280/5 F |
| 422807 | 2/1923 | Fed. Rep. of Germany | 280/5 A |
| 1555391 | 8/1970 | Fed. Rep. of Germany | 180/77 S |

*Primary Examiner*—John P. Silverstrim
*Attorney, Agent, or Firm*—Penrose Lucas Albright

[57] ABSTRACT

A tractor with two engines arranged in tandem, each carried by a frame portion pivotable relative to the other counterbalances about a vertical axis under the rear engine. The body of the tractor is narrow forward and to the rear wherein axles for front and rear sets of ground engaging wheels extend laterally and mount six wheels each. The front engine and rear engines extend forward of the respective front and rear sets of ground wheels. The front frame portion is turnable axially relative to the rear frame portion under the rear engine and steering is accomplished by the relative pivoting of the portions about the aforesaid vertical axis. A fuel tank forms a guard over the rear set of wheels and includes a depression for an operator's seat. The fuel tank has a central partition and is optionally hinged in its outer portions whereby the width of the tractor is reduced by removing the outer wheels and pivoting the outer portions of the fuel tank to the rear. A lifting device extends aft between the central rear wheels which is clearly visible from the operator's seat. The distribution of weight of the frame portions counterbalances loads on the lifting device to minimize stress at the pivot between the frame portions.

18 Claims, 6 Drawing Figures

ARTICULATED TRACTOR POWERED BY TANDEM ENGINES

RELATED APPLICATION

This is a division of application Ser. No. 703,652, filed July 8, 1976, now U.S. Pat. No. 4,181,315.

SUMMARY OF THE INVENTION

This invention relates to tractors of the kind which comprise two frame portions that are disposed one behind the other with respect to the intended direction of forward travel of the tractor, each frame portion being connected to a corresponding axle and each axle being provided with a plurality of ground wheels.

According to the invention, there is provided a tractor of the kind set forth, wherein the rear frame portion is provided with a three-point lifting device or hitch and with a rear engine which is located between the ground wheels of the rear axle and those of the front axle as seen in plan view and with respect to said intended direction of travel, and wherein the front frame portion carries a front engine which is located wholly or partly in advance of the ground wheels of the corresponding axle, said two frame portions being pivotable relative to one another about an axis that is defined by parts located beneath the rear engine.

For a better understanding of the invention, and to show how the same may be carried into effect, reference will now be made, by way of example, to the accompanying drawings, in which:

DESCRIPTION OF THE PREFERRED EMBODIMENTS

Figure 1:
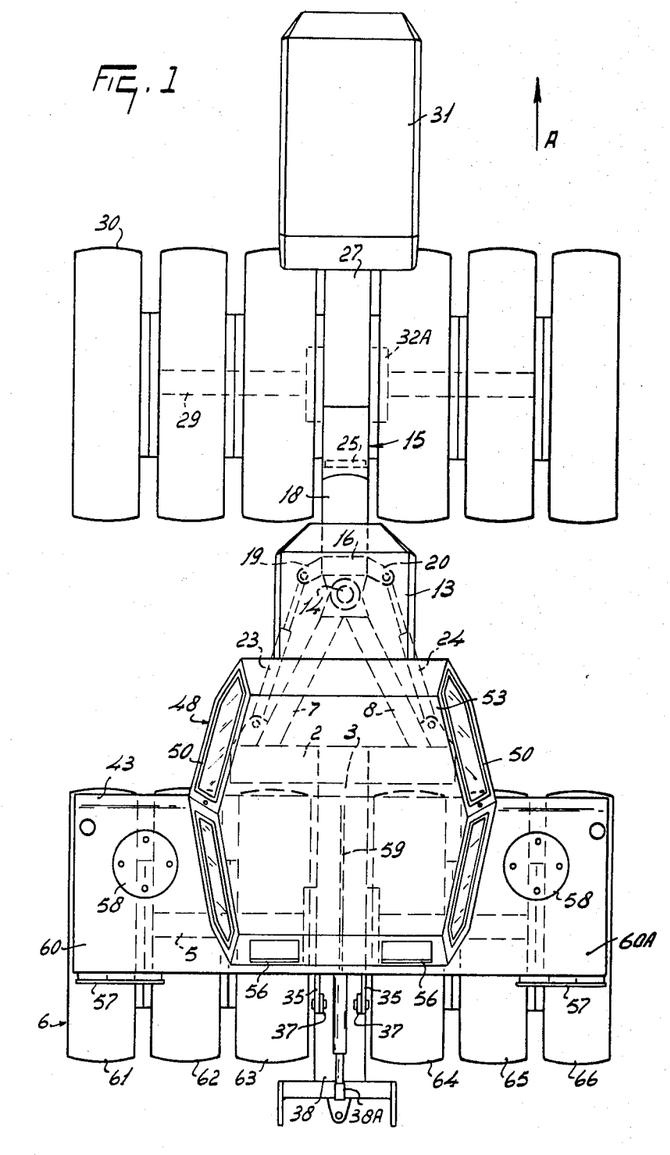
FIG. 1 is a plan view of a tractor in accordance with the invention.
Figures 2, 6:
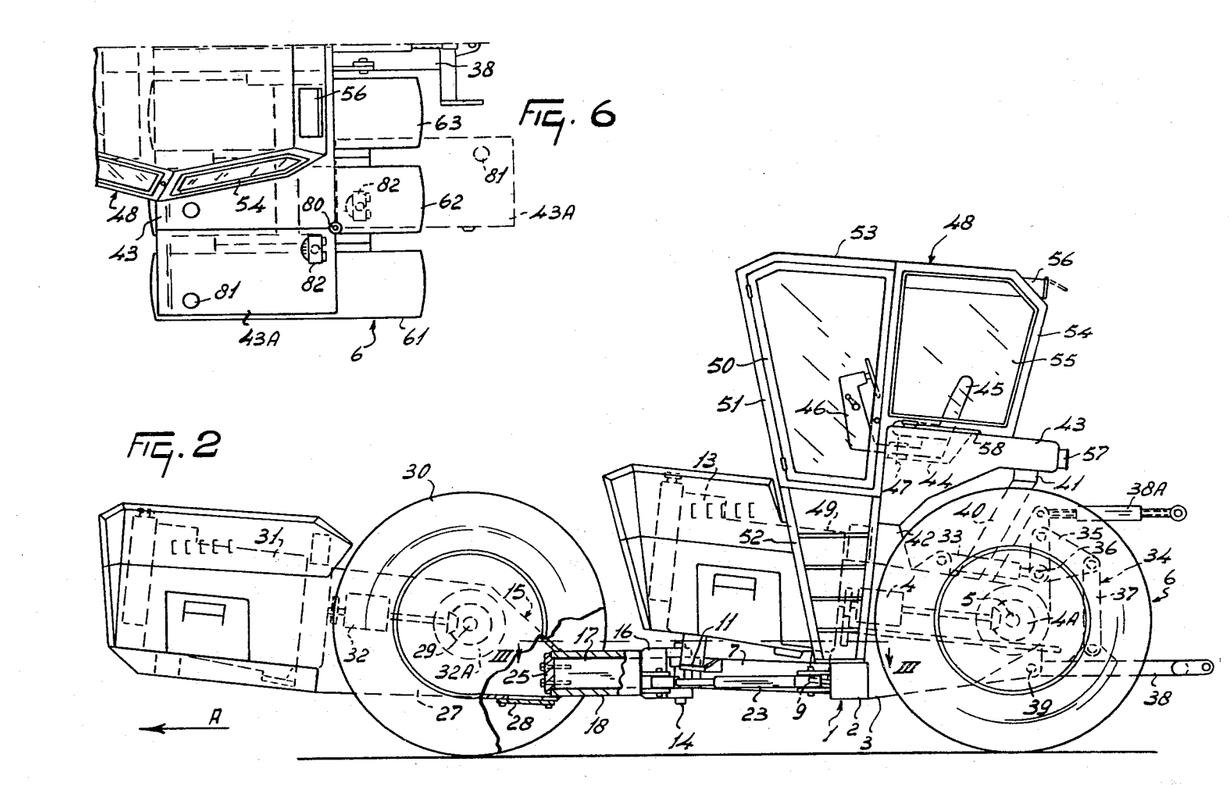
FIG. 2 is a side elevation of the tractor of FIG. 1 with some parts shown in section.
FIG. 6 is a partial plan view illustrating one modification of a tractor in accordance with the invention.
Figure 3:
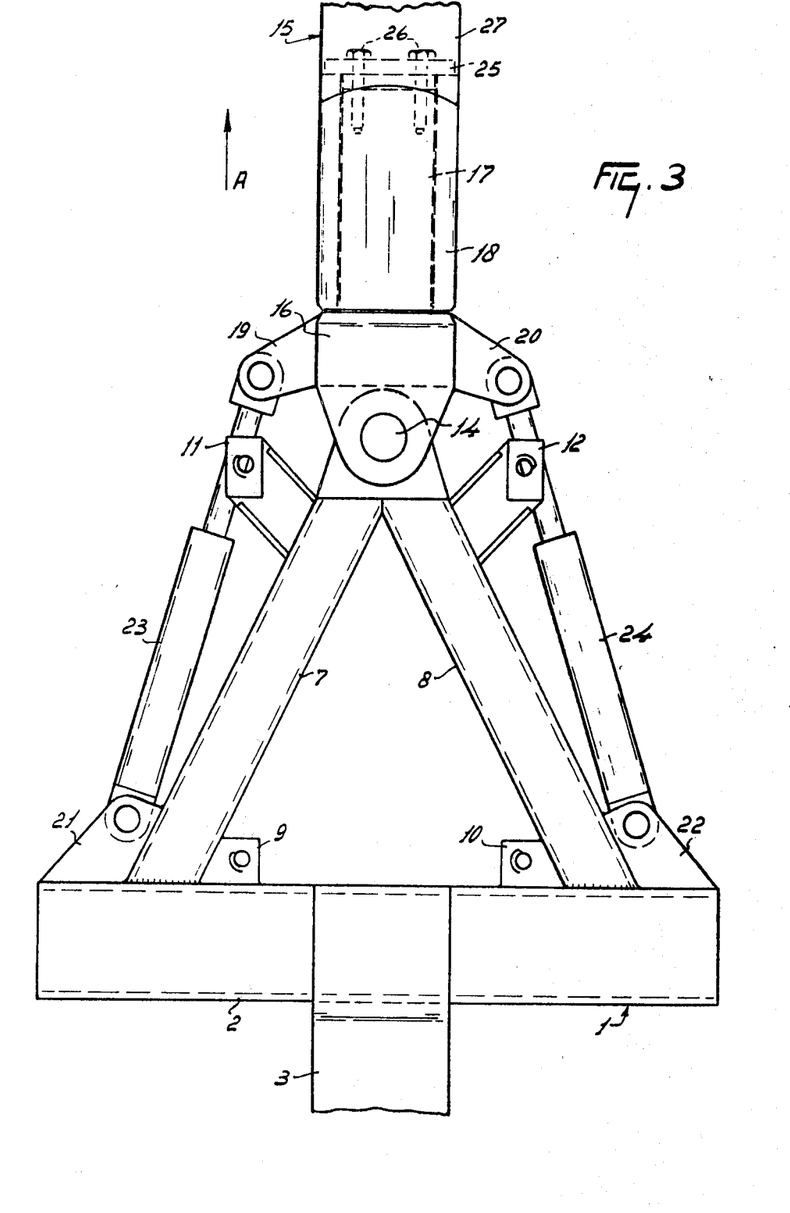
FIG. 3 is a section, to an enlarged scale, taken on the line III—III in FIG. 2.

Referring to FIGS. 1 to 3 of the drawings, the tractor that is illustrated therein has a frame which comprises a rear portion 1 and a front portion 15 that are pivotable relative to one another in a manner which will be described below. The rear frame portion 1 includes a hollow frame beam 2 of substantially square cross-section that extends substantially horizontally perpendicular to the intended direction of straight forward travel of the tractor that is indicated in the drawings by an arrow A, said beam 2 advantageously having a length of substantially 1.7 meters. The rear frame portion 1 also includes a housing 3 that is connected to a central location on the beam 2 so as to extend rearwardly therefrom in a direction opposite to the direction A. The housing 3 is formed from sheet metal or other sheet material and has a height which is substantially four times its preferred width of substantially 0.4 meters, measured in a direction perpendicular to the direction A. The housing 3 accommodates a torque converter 4 and a differential 4A, the latter being in driving communication with the two half shafts of a rear axle 5. The rear axle 5 carries rear wheels 6 of the tractor and it is preferred that, as illustrated, there should be three of those rear wheels 6 connected to each of the two half shafts of the rear axle 5 although a lesser, or even greater, number of the rear wheels 6 may, if preferred, be provided. Such rear wheels 6 may be of the kind illustrated in the drawings or may be other wheels. The arrangement of the rear wheels 6 will be discussed in greater detail below.

Two hollow supports 7 and 8 have their rear ends rigidly secured to the front of the frame beam 2 so as to project substantially horizontally forwardly from the latter in convergent relationship with one another, their leading ends being rigidly interconnected. As can be seen in FIG. 3 of the drawings, the two forwardly convergent supports 7 and 8 together form, with the frame beam 2, a frame portion that is of substantially equilateral triangular configuration, it being noted that the two supports 7 and 8 are arranged symmetrically with respect to an imaginary vertical plane of substantial symmetry of the tractor that extends parallel to the direction A. Engine supporting brackets 9 and 10 are rigidly mounted in the corners of the substantially equilateral triangular frame portion between the beam 2 and the support 7 and between the beam 2 and the support 8, respectively. Two further engine supporting brackets 11 and 12 are inclined outwardly, upwardly and forwardly (with respect to the direction A) in a symmetrical manner from locations close to the leading ends of the outer sides of the two hollow supports 7 and 8, respectively and it will be noted that, as seen in plan view (FIG. 5), the effective engine mounting points of the four brackets 9, 10, 11 and 12 are at the four corners of an oblong rectangle, a plane which contains all four of said points being inclined to the horizontal at an angle of substantially 10° in such a way that, as seen in FIG. 2 of the drawings, said plane extends obliquely forwardly and upwardly with respect to the direction A. An internal combustion engine 13 is supported from beneath by the four brackets 9, 10, 11 and 12 and is enclosed in an openable cowling formed from sheet metal and/or other sheet material. The pivotal connection between the two frame portions 1 and 15 is arranged beneath a front region of the forwardly and upwardly inclined bottom of the engine 13 and is in the form of a substantially vertical shaft 14, said shaft 14 being journalled in a bracket carried at the leading interconnected ends of the hollow supports 7 and 8 and in a fork 16, the limbs of which are disposed above and beneath said bracket, both the bracket and the fork 16 being arranged symmetrically with respect to the aforementioned imaginary vertical plane of substantial symmetry of the tractor that extends parallel to the direction A. As seen in side elevation (FIG. 2), the base of the fork 16 occupies substantially the same position of advance with respect to the direction A as does the front of the engine 13 and it will be seen that a tubular shaft 17 has its rear end rigidly secured to said base so as to project substantially horizontally forwards therefrom in the direction A.

A sleeve 18 is arranged turnably around the forwardly projecting tubular shaft 17 of the rear frame portion 1, said sleeve 18 being part of the front frame portion 15 of the tractor. The sleeve 18 co-operates with the tubular shaft 17 to afford a substantially horizontal axis, that is substantially parallel to the direction A, about which the two frame portions 1 and 15 are turnable relative to one another. Electrical and/or mechanical control cables and/or hydraulic ducts and/or fuel ducts extend through the interior of the hollow shaft 17 for the control of functions of the front frame portion 15 and parts that are carried thereby, such control cables and/or ducts being omitted in the accompanying drawings for the sake of simplicity. It will be appreciated that the two frame portions 1 and 15 are effectively universally pivotable relative to one another because of their interconnection by way of the closely neighboring substantially vertical pivotal shaft 14 and the substantially horizontal tubular shaft 17 and cooperating sleeve 18. Substantially horizontally disposed lugs 19 and 20 project outwardly from the opposite sides of the fork 16 in upper and lower pairs and further upper and lower pairs of lugs 21 and 22 are rigidly mounted in the obtuse corners between the frame beam 2 and the support 7 and between the frame beam 2 and the support 8, respectively, said lugs 21 and 22 also being substantially horizontally disposed. The pairs of lugs 19, 20, 21 and 22 serve to carry substantially vertical pivot pins at the free ends of the piston rods of hydraulic piston and cylinder assemblies 23 and 24 and at the base ends of the cylinders of those two assemblies in the manner which can be seen best in FIG. 3 of the drawings. The two assemblies 23 and 24 are single-acting piston and cylinder assemblies and co-operate with the pairs of lugs 19 to 22 inclusive to form parts of the steering mechanism of the tractor, it being evident that, when hydraulic pressure medium is caused to extend the piston rod of one of the assemblies while the cylinder chamber of the other assembly is not under pressure, the two frame portions 1 and 15 will be turned relative to one another about the axis of the shaft 14 so that the tractor will steer to the right or to the left. It is not, in fact, essential to provide the two single-acting piston and cylinder assemblies 23 and 24 since, if preferred, steering could be effected by an appropriate simple arrangement of a single double-acting hydraulic piston and cylinder assembly.

In order to prevent axial disengagement of the sleeve 18 from the tubular shaft 17 which it turnably surrounds, a retaining plate 25 is fastened by bolts 26 to the leading end of that shaft 17 in such a way that the periphery of the plate 25 lies in front of part of the thickness of the sleeve 18 with respect to the direction A. A frame housing 27 that is basically similar to the previously described housing 3 is secured to the leading end of the sleeve 18 immediately beyond the periphery of the retaining plate 25, said frame housing 27 having a length in the direction A that is substantially four times its width in a direction perpendicular thereto and being of symmetrical formation with respect to the imaginary vertical plane of substantial symmetry of the tractor that extends parallel to the direction A. The frame housing 27 extends forwardly from the sleeve 18 in the direction A and its bottom is formed with a trap, that is closed by a cover 28 (FIG. 2), through which trap the retaining plate 25 and its securing bolts 26 are accessible when the cover 28 is removed. The frame housing 27 accommodates a differential 32A which, like the differential 4A, may be of a basically conventional construction, said differential 32A being in driving connection with the two half shafts of a front axle 29. Said two half shafts are each, like the two half shafts of the rear axle 5, provided with three equidistantly spaced apart driven front wheels 30 that may, as illustrated, be pneumatically tired wheels or some or all of which could, for particular purposes, be wheels of other kinds. Also, like the rear wheels 6, there could be less than a total of six of the front wheels 30 or even more than six of them. Each of the pneumatically tired rear wheels 6 and front wheels 30 has a diameter of substantially 1.75 meters and, when the tractor is disposed for straight travel, the distance between the axes of rotation of its rear and front axles 5 and 29 is conveniently substantially 3.1 meters when the other advantageous measurements that have been mentioned are adopted. As seen in plan view (FIG. 1), the internal combustion engine 13 is located between the rear extremities of the front wheels 30 and the leading extremities of the rear wheels 6.

The front of the frame housing 27 with respect to the direction A carries an internal combustion engine 31 which preferably, but not essentially, is identical to the internal combustion engine 13. Different engines 13 and 31 can, if preferred, be employed but it is preferred to synchronize the two units while retaining the possibility of using either one of them independently of the other. The rearwardly directed output shaft of the leading engine 31 is arranged to drive the input shaft of a torque converter 32 the output shaft of which, in turn, drives the input shaft of the differential 32A. The torque converter 32 is enclosed inside the frame housing 27 with the differential 32A. The front engine 31 substantially symmetrically straddles the imaginary vertical plane of substantial symmetry of the tractor that extends parallel to the direction A and, as seen in plan view (FIG. 1), it is located wholly, or at least principally, in advance of the front ground wheels 30. The engine 31 is, of course, like the engine 13, enclosed in an openable cowling formed wholly or principally from sheet metal and/or other sheet materials. Each of the two engines 13 and 31 is rated at not less than substantially 100 horsepower and preferably has a rating of not less than substantially 200 horsepower.

A hydraulic mechanism 33 is arranged on top of the housing 3 of the rear frame portion 1 and has parts located at the rear upper edge of that housing, said mechanism 33 being arranged to operate a rear-mounted three-point lifting device or hitch 34 of the tractor. The lifting device or hitch 34 is of high power rating and is constructed and arranged so that it can raise loads of up to substantially 4000 kilograms in weight. The lifting device or hitch 34 comprises two lifting arms 35 that are located alongside one another so as to be upwardly and downwardly turnable about the horizontally aligned axes of two shafts 36 that extend perpendicular to the direction A. The shafts 36 are turnable hydraulically by the mechanism 33 in a manner which is known per se and which it is not necessary to describe to move the arms 35 either upwardly or downwardly. Rear extremities of the arms 35 are pivotally connected to the upper ends of links or rods 37 having lower ends which, in turn, are pivotally connected to lugs carried on top of a single lower lifting link or arm 38. The leading end of the arm 38 is pivotally connected by substantially horizontally aligned shafts 39 to plates at the rear and bottom of the housing 3, the axis defined by the aligned shafts 39 being perpendicular to the direction A. It can be seen in FIG. 2 of the drawings that the pivots by which the lower ends of the links or rods 37 are connected to the lugs carried by the single lower lifting link or arm 38 are located substantially midway along the length in the direction A of that link or arm 38. A transverse plate at the rearmost end of the link or arm 38 carries two horizontally spaced apart lugs which afford the two lower coupling points of the three-point lifting device or hitch 34 and said device or hitch 34 also comprises a single pivotably mounted upper lifting link 38A the length of which is adjustable in the known manner which can be seen in outline in FIGS. 1 and 2 of the drawings.

A support 40 that extends obliquely upwardly and rearwardly with respect to the direction A from the top of the frame portion 1 at a location just in front of the lifting arms 35 carries, at its uppermost end, a transverse supporting beam 41, said beam 41 (FIG. 2) extending throughout substantially the whole of the width of the tractor in a direction horizontally perpendicular to the direction A at a location substantially vertically above the rear axle 5. A support 42 that is of rhomboid configuration when seen in side elevation (FIG. 2) is arranged on top of the housing 3 close to the front of that housing, said supporting beam 41 and support 42 together carrying a liquid fuel tank 43 that extends throughout substantially the whole of the width of the tractor in a horizontal direction perpendicular to the direction A. In addition to its fuel-holding function, the tank 43 also forms part of the rear frame portion 1 of the tractor. As seen in side elevation (FIG. 2), the tank 43 is of approximately, but not exactly, right-angled triangular configuration and preferably has a front to rear measurement of substantially 1.1 meters and a height of substantially 0.6 meters. The bottom of the tank 43 is sustained from beneath by the support 42 while an upper rear portion thereof is sustained from beneath by the transverse supporting beam 41. The tank 43 has a substantially flat front wall which, as seen in plan view (FIG. 1), is located substantially in register with the leading extremities of the rear wheels 6. The top of the tank 43 is also substantially flat and is inclined at substantially 90° to the flat front wall thereof. However, midway across the width of the tank 43, it is formed with a countersunk depression 44 that receives a turnably mounted driving seat 45 together with control members 46 of the tractor which include a steering wheel or steering lever. The flat (apart from the formation of the countersunk depression 44) top of the tank 43 has its general plane inclined to the horizontal at an angle of substantially 10° in such a way that said plane extends obliquely upwardly and forwardly with respect to the direction A. The driving seat 45 and the control members 46 are turnable about the upwardly extending axis of a pivot 47 that is mounted in the base of the depression 44 very close to the front thereof. Means (not illustrated) is provided to retain the seat 45 and control members 46 in the illustrated position in which a driver occupying the seat 45 faces forwardly with respect to the direction A or in a position in which said parts 45 and 46 have been turned through substantially 180° about the axis of the pivot 47 to enable a driver occupying the seat 45 to face rearwardly with respect to the direction A. Such means is not illustrated in the accompanying drawings but it is noted that the control members 46 are constructed and arranged so as to be correctly operable in either of the two described angular positions of the parts 45 and 46 about the axis of the pivot 47. In the embodiment illustrated in FIGS. 1 to 3 of the drawings, the axis of the pivot 47 is inclined to the strictly vertical at an angle of substantially 10°.

As previously mentioned, the fuel tank 43 is part of the rear frame portion 1 of the tractor and affords some of the bottom of a driving cabin 48 thereof. As seen in plan view (FIG. 1), the driving cabin 48 has a lowered floor portion 49 (FIG. 2) which is disposed close to the fronts of the rear wheels 6 and forwardly of the fuel tank 43. Front regions of the sides of the cabin 48 have closeable doors 50 which flank the lowered floor portion 49 and communicate directly therewith. A windowed front wall 51 of the cabin 48 is inclined downwardly and rearwardly with respect to the direction A from substantially its top to its bottom and lies immediately in front of the hinged leading edges of the closeable side doors 50. Flights of steps 52 give access to the two side doors 50 and each flight may conveniently comprise five steps. The flights of steps 52 have their lower ends secured to the hollow frame beam 2 and thus strengthen the cabin 48 and its mounting on the rear frame portion 1. The uppermost step or rung of each flight of steps 52 terminates at the level of the lowered floor portion 49 of the cabin by the closeable side door 50 concerned. The top of the cabin 48 has a roof 53 with a rearmost edge, as seen in the plan view of FIG. 1, which is in substantial vertical register with the rear axle 5, the rear edge of the roof 53 coinciding with the upper edge of a windowed rear wall 54 of the driving cabin 48 which rear wall is inclined steeply downwardly, and forwardly with respect to the direction A, from its junction with the roof 53. The loweredge of the rear wall 54 abuts against the flat upper surface of the fuel tank 43. In addition to the windowed side doors 50, the cabin 48 has windowed side walls 55, the general planes of which are inclined to those of the doors 50 when the latter are closed (see FIG. 1). The side walls 55 thus extend between the rear edges of the doors 50 and the rear wall 54 of the cabin. The driving cabin 48 conveniently has a width, in a horizontal direction that is perpendicular to the direction A, of between substantially 1.6 meters and substantially 2.0 meters, the roof 53 conveniently being at a height of substantially 3.2 meters above the ground surface. A rear region of the roof 53 is provided with an air conditioning system 56 for the interior of the cabin 48, said system 56 communicating with the ambient atmosphere through rearwardly directed openings in an inclined surface at the top of the rear wall 54.

As seen in plan view (FIG. 1), the fuel tank 43 extends rearwardly beyond the axle 5, its rearmost extremity carrying rear lights 57 of the tractor and illuminated direction indicators and the like. That surface of the tank 43 which faces downwardly is in the form of a plurality of relatively inclined planes (see FIG. 2) but could also be of regularly cylindrically curved configuration. In either case, the arrangement is such that the fuel tank 43 serves as a mud guard for the rear wheels 6. Access to the interior of the fuel tank 43 may be had, when required, by way of two hand holes or manholes that are formed in the top of the tank alongside the windows of the side walls 55 of the cabin 48, said hand holes or manholes usually being closed by bolted covers 58. The fuel tank 43 is divided internally into two compartments 60 and 60A by a vertical partition 59 that is coincident with the aforementioned imaginary vertical plane of substantial symmetry of the tractor that extends parallel to the direction A, said two compartments 60 and 60A thus being of substantially the same volume and of substantially symmetrically identical configuration. If desired, the partition 59 may be formed by a wash-bulkhead that oppose a swinging of the fuel in the fuel tank if this is preferred having regard to the particular work which the tractor is likely to have to undertake. Generally speaking, one of the two compartments 60 and 60A may contain fuel for the engine 13 while the other contains fuel for the engine 31 but other possibilities include dividing the tank 43 into more than two compartments, this being particularly useful where the tractor has engines that are capable of operating with different kinds of fuels. The fuel tank 43 conveniently has a total capacity of between substantially 1000 and substantially 1500 liters, a capacity of substantially 1200 liters being preferred with the particular dimensions of the tractor that have been mentioned above. If desired, outer portions of the tank 43 may be constructed so as to be detachable from a central portion thereof so that said outer portions can be readily exchanged for example for refuel purposes. Moreover, the tank 43 could be smaller with independent tanks located alongside it in place of the outer tank portions that have just been mentioned. Such independent tanks could be employed as reservoirs for liquid materials to be distributed by spraying or sprinkling.

It can be seen in FIG. 1 of the drawings that the rear wheels 6 comprise a row of six pneumatically tired driven ground wheels 61, 62, 63, 64, 65 and 66 that are arranged in two groups 61/63 and 64/66 of three wheels per group, the two groups being located at opposite sides of the imaginary vertical plane of substantial symmetry of the tractor that extends parallel to the direction A. The six rear ground wheels 61 to 66 inclusive form parts of the original equipment of the tractor, the three wheels 61/63 and 64/66 of each of the two groups being rigidly secured to each other so as to be rotatable about the axis of the corresponding half shaft of the rear axle 5 as a single unit. Due to the provision of the differential 4A, the two groups of three wheels 61/63 and 64/66 can revolve at different speeds when, for example, the tractor is following a curved path of travel. As previously mentioned, each of the six wheels 61 to 66 inclusive has an overall diameter of substantially 1.75 meters in the embodiment that is illustrated in the accompanying drawings and it is preferred that this measurement should always be between 1.4 and 1.9 meters inclusive and that it should certainly not be less than 1.0 meter.

The rear frame portion 1 principally comprises the frame beam 2, the housing 3 and the fuel tank 43 and, as illustrated in plan view (FIG. 1), it has a width which varies very considerably at different locations therealong in the direction A. Thus, the width of the frame beam 2 in a horizontal direction that is perpendicular to the direction A is substantially equal to the distance between the outer surfaces of the tires of the two inner rear wheels 63 and 64. The widths of the further parts of the frame that are located in front of the rear wheels 6 are, inclusive of any outer cowling plates or other covering sheets, substantially equal to the distance between imaginary vertical planes of symmetry of the tires of the two wheels 63 and 64 that extend parallel to the direction A midway between the opposite side surfaces of each tire. These further parts of the frame include the hollow supports 7 and 8, the engine supporting brackets 9 and 10 and the rear engine 13 itself. That part of the rear frame portion that is located behind the beam 2 with respect to the direction A has a considerably reduced width as compared with the beam 2 itself and the parts of said frame portion 1 that are located in advance thereof. Said part is primarily afforded by the housing 3 which housing has a width of between substantially 300 millimeters and substantially 450 millimeters to enable it to be accommodated in the space between the tires of the two inner rear ground wheels 63 and 64. In the particular embodiment that is illustrated in the drawings, the housing 3 has a width of substantially 350 millimeters.

The frame housing 27 of the front frame portion 15 is flanked at each of its two opposite sides by three of the six front ground wheels 30, those ground wheels being connected to the two half shafts of the front axle 29 in the same manner as the rear ground wheels 6 are connected to the two half shafts of the rear axle 5. The illustrated tractor has an overall width of substantially 3.5 meters and an overall length of substantially 7.0 meters. The tractor has a minimum turning circle of not more than substantially 10.0 meters due to the advantageous location of the pivotal shaft 14 beneath the rear engine 13 at a distance of between 1.1 and 1.5 meters (preferably substantially 1.25 meters) behind the front axle 29, said distance being between substantially 30% and substantially 50% (preferably substantially 40%) of the perpendicular distance between the axes of rotation of the two axles 5 and 29 when the tractor is disposed for straight travel.

Tractors with engines that have high power ratings are, of course, required to be able to exert a very strong tractive effort during operation. One way in which this requirement can be met is to equip such tractors with a driven front axle as well as a driven rear axle. When all of the ground wheels are driven wheels, the transmission thereto is materially simplified by employing separate engines to power the two axles and such tractors are sometimes known as "tandem" tractors. One disadvantage of such "tandem" tractors is that the tractive effort which standard commercially available tractor tires can transfer to soft or otherwise weak soil is insufficient because the number of tires which the tractor has is too small thus limiting the area of tire/soil contact with the result that the tires slip and sink into the grooves which they themselves form in the soft soil. In the case of the tractor which has been described with reference to FIGS. 1 to 3 of the drawings, the two narrow frame housings 3 and 27 accommodate direct drive transmissions to the front and rear wheels 30 and 6, respectively, said transmissions including corresponding torque converters 32 and 4 and corresponding differentials 32A and 4A. The particular construction which allows the housings 3 and 27 to be of narrow width results in there being sufficient space to accommodate corresponding rows of six ground wheels 6 and 30 so that there are twelve tires in contact with the ground surface with a consequently reduced pressure exerted by each tire upon that surface. Even on very soft and weak soil, the likelihood of wheel slippage is very low so that all of the engine power that is applied to the two drive transmissions can be converted into available tractive effort. The engines are thus utilized economically and effectively without the tractor having an excessive overall width in a horizontal direction that is perpendicular to the direction A.

It will be realized that, in order to obtain as high as possible an available tractive effort from the power output of the two engines, it is important that the weight of the tractor should be substantially uniformly distributed between the front and rear ground wheels 30 and 6 with substantially 50% of the weight of the tractor supported from the soil by way of the front ground wheels 30 and substantially 50% thereof supported from the soil by way of the rear ground wheels 6. This desirable arrangement is quite easily achieved in a "tandem" tractor as discussed above by judicious disposition of its two engines but the disadvantages has been found, with known "tandem" tractors, that they are only maneuverable with difficulty because of their high weight. In particular, the heavy weight that is exerted on the front axle exposes the steering mechanism to high loads so that is has to be very robustly constructed and/or strengthened while the driver of such a tractor has to exert considerable steering effort which rapidly becomes very tiring. Known "tandem" tractors are usually of considerable overall length and are thus incapable of being readily maneuvered in limited spaces. In the case of the tractor that has been described with reference to FIGS. 1 to 3 of the drawings in which steering is effected by pivoting the frame portions 1 and 15 relative to one another about an axis (afforded by the shaft 14) that is located beneath the rear engine 13, it has been found that the forces that have to be resisted by the two frame portions 1 and 15 of the tractor are very advantageously distributed in those two frame portions. For example, it is of considerable importance that any torque occurring close to the shaft 14 should be of very low magnitude under all conditions of operation of the tractor and it will be borne in mind that varying loads that may be supported by the three-point lifting device or hitch 34 are significant in this respect. It has been found that a disposition of the shaft 14 at substantially 1.25 meters behind the front axle 29 gives substantially optimum results in this regard. A further advantage of this particular disposition of the shaft 14 beneath the rear engine 13 is the considerably improved maneuverability of the tractor which results as compared with "tandem" tractors in which the steering axis is located very close to the front axle thereof.

Since the two frame portions 1 and 15 of the tractor are interconnected in a substantially universally pivotable manner by the substantially vertical shaft 14 and the substantially horizontal tubular shaft 17 and cooperating sleeve 18, the two frame portions can move relative to one another, as may be required, during travel and can match undulations and/or slopes in the surface of the soil in an extremely effective manner. Not only does the fuel tank 43 strengthen the rear frame portion 1, but it also significantly increases the pressure which the rear wheels 6 exert upon the ground surface due to its disposition immediately above those rear ground wheels, said tank 43 being of high volume and thus of heavy weight, particularly when it is fully loaded with liquid fuel. The high volumetric capacity of the tank 43, which is preferably substantially 1200 liters, allows the tractor driver to continue with heavy work for many hours without the need to refuel the tractor from a source that may be quite distant from the work site. As the fuel tank 23 is effectively part of the rear frame portion 1 itself, it is advantageous to dispose the seat 45 and the associated control members 46 on top of the tank 43. With this arrangement, and when the tank 43 extends throughout substantially the whole of the width of the tractor, the tank has a large volumetric capacity and the available space on the rear frame portion 1 thereof is utilized very effectively. If it is known that the tractor will work principally, or often, on sloping fields, then it is particularly desirable to form the partition 59 as a wash-bulkhead to provide two or more partitions. This prevents all of the available fuel from moving to the downward end of the tank 43 when the tractor is working to an fro across sloping land.

Figure 4:
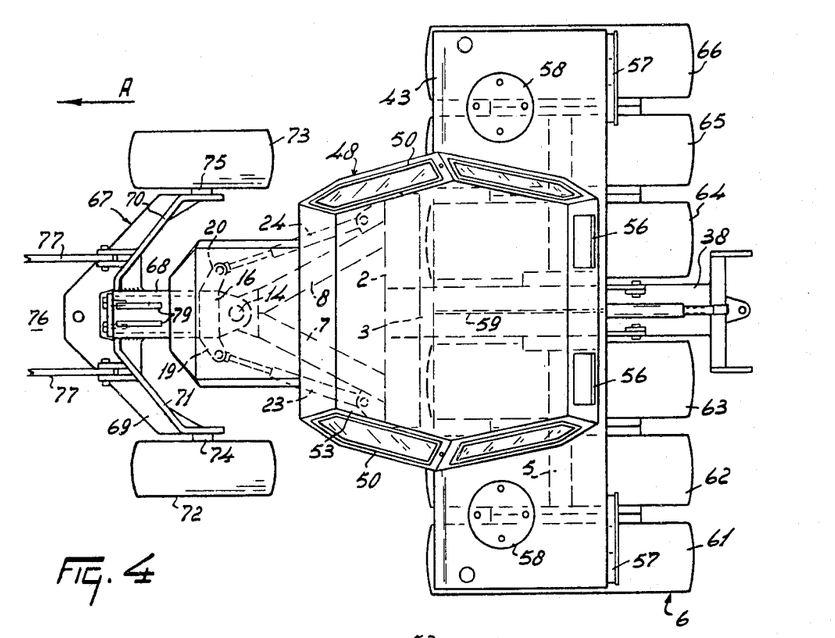
FIG. 4 is a plan view of the tractor of FIGS. 1 to 3 provided with alternative parts.
Figure 5:
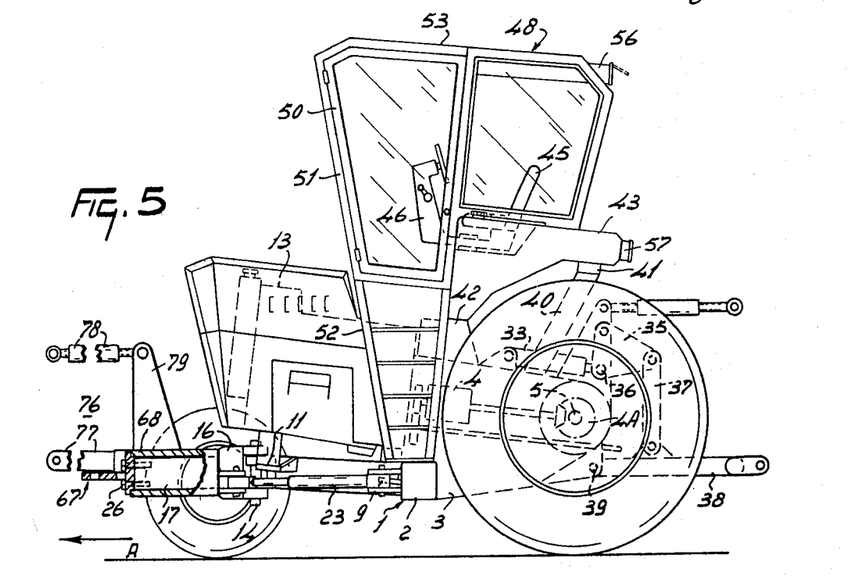
FIG. 5 is a side elevation of the tractor of FIG. 4.

FIGS. 4 and 5 of the drawings illustrate the tractor that has already been described with reference to FIGS. 1 to 3 but with the front frame portion 15 replaced by a front frame portion 67 of a different construction. The front frame portion 67 includes a substantially horizontally disposed sleeve 68 that is equivalent in construction and function to the previously described sleeve 18, said sleeve 68 being arranged turnably around the hollow shaft 17 of the rear frame portion 1 and being retained in its axially appointed position relative to that shaft 17 by the plate 25 and its fastening bolts 26. A wheel-carrier 69 in the form of a strong shaped plate is rigidly connected to the sleeve 68 and, as seen in plan view (FIG. 4), is substantially V-shaped, the point of the V being orientated forwardly with respect to the direction A. The wheel-carrier 69 is strengthened by the provision of upright stiffening ribs 70 and 71 that extend substantially perpendicularly upwards from the top surface of the carrier 69. As can be seen in FIG. 4, the ribs 70 and 71 together define a substantially V-shaped figure whose point is again orientated forwardly with respect to the direction A. The outer rearmost ends of the wheel carrier 69 and its stiffening ribs 70 and 71 carry horizontally aligned axles 74 and 75 on which pneumatically tired ground wheels 72 and 73 are rotatably mounted. Each of the two front ground wheels 72 and 73 has an overall diameter which is substantially equal to half that of one of the rear ground wheels 6, said diameter thus preferably having a magnitude of substantially 0.85 meters.

The front frame portion 67 is provided with a three-point lifting device or hitch 76 that is of a construction which is known per se, said device or hitch 76 comprising pivotably mounted lower lifting links 77 and a pivotably mounted upper lifting link 78 that is of adjustable length, the rear end of the upper link 78 being turnably mounted between two upright parallel plates 79 that are both fastened to an upper region of the curved surface of the sleeve 68. The three-point lifting device or hitch 76 is illustrated only diagrammatically in FIGS. 4 and 5 of the drawings but is, preferably, of substantially the same type as the rear three-point lifting device or hitch 34, said device or hitch 76 thus being capable of raising very heavy loads of up to substantially 4000 kilograms in magnitude.

It is only necessary to remove the trap cover 28 and to undo the retaining bolts 26 to enable the front frame portion 15 of the tractor to be replaced by an alternative front frame portion such as, for example, the portion 67 that has been described above with reference to FIGS. 4 and 5 of the drawings. Instead of carrying the second and leading engine 31, the alternative front frame portion 67 is provided with the three-point lifting device or hitch 76, the latter being appropriate for the front-mounting of heavy implements, tools and machinery of many different kinds. When the substitution of the front frame portion 67 for the front frame portion 15 has been made and when its three-point lifting device or hitch 76 carries a heavy load, the torque that is exerted in the region of the shaft 14 will be quite low despite the omission of the front engine 31 and its replacement by the three-point lifting device or hitch 76 and its attached implement, tool or machine. The provision of the alternative front frame portion 67 is particularly useful in cases where there is no necessity for a very high tractive effort to be exerted by the tractor but where there is, instead, the need to provide coupling means for an implement, tool or machine that is to operate in front of the tractor with respect to its intended direction of forward travel A or at the rear of the tractor when its driving seat 45 and control members 46 are arranged for the driver to face rearwardly with respect to the direction A so that the normal "front" and "rear" of the tractor are effectively interchanged. Under such circumstances, the disposition of the pivotal shaft 14 beneath the engine 13 is again very advantageous.

FIG. 6 of the drawings illustrates a way in which the overall width of the tractor can be reduced, when required, to enable it to comply with maximum width regulations that apply in some countries to the use of vehicles on public roads. As shown in FIG. 6, outer portions 43A of the fuel tank 43 are turnable about vertical pivot pins 80 relative to the central portion of the tank 43 to bring them to the symmetrically similar positions one of which is shown in broken lines in FIG. 6 in which said outer portions 43A lie behind the main central portion of the tank 43. With such an arrangement, it is desirable for the outer tank portions 43A to have their own individual screwthreaded or other filler caps 81 and it can be seen that each portion 43A carries a corresponding rear lighting unit 82 on its top surface, the lighting units 82 being turnable about corresponding substantially vertical pivots so that they may be disposed to face rearwardly whichever of the two possible positions of the tank portions 43A are adopted. In addition to re-positioning the tank portions 43A, the outermost rear ground wheels 61 and 66 are removed to reduce the width of the path of travel of the rear wheels and, similarly, the two outermost front ground wheels 30 are also removed for the same reason when the front frame portion 15 is in use. It will be noted from FIG. 6 that, when the outer portions 43A of the tank 43 are turned rearwardly into the positions thereof that are shown in broken lines for one of them, said portions 43A serve as additional mud guards for the rear wheels 62 and 65 and for parts of the wheels 63 and 64.

The invention has been described with particular reference to agricultural tractors but it is to be noted that it is equally applicable to tractors that are not primarily intended for agricultural use and to vehicles that are constructed principally for civil engineering operations and the like. Accordingly, the term "tractor" is to be broadly interpreted throughout this Specification as including vehicles of all these kinds within its scope.

Although certain features of the tractor described and illustrated in the accompanying drawings are set forth in the following claims as inventive features, it is emphasized that the invention is not necessarily limited to those features and includes within its scope each of the parts of the tractor that has been described, that is illustrated in the accompanying drawings, both individually and in various combinations.

What we claim is:

1. A tractor for extended agricultural operations at sites remote from sources for refueling which comprises a frame, at least one engine carried by said frame, ground engaging wheels mounted to extend outwardly on opposite sides of said frame to support said frame from a front axle and rear axle connected to said frame, said ground engaging wheels being mounted on said rear axle in a row, at least a portion of said ground engaging wheels operatively connected to said engine, at least one high volumetric capacity fuel tank having a width transverse to the longitudinal axis of the tractor substantially greater than its length parallel to said axis and extending outwardly on each of its lateral sides beyond said frame, at least part of said fuel tank being disposed vertically above said row of said ground engaging wheels on each side of said frame provided to support said tractor frame, a driver's seat arranged immediately above the top of said fuel tank, and a lifting device mounted on said frame to extend to the rear of said tractor from between said ground engaging wheels of said row, the relationship between said driver's seat and said lifting device being such that an operator in said driver's seat is provided with a substantially unobstructed view of implements mounted on said lifting device.

2. A tractor as claimed in claim 1, wherein at least part of said fuel tank is disposed vertically and entirely above said rear axle on which said ground engaging wheels are mounted.

3. A tractor as claimed in claim 2, wherein the width of said fuel tank is disposed substantially perpendicular to the longitudinal axis of the tractor and is at least twice said length.

4. A tractor as claimed in claim 3, wherein said fuel tank extends throughout substantially the entire of the width of the tractor including said row of ground engaging wheels.

5. A tractor as claimed in claim 4, wherein said fuel tank is divided into compartments by at least one longitudinally extending partition provided therein.

6. A tractor as claimed in claim 5, comprising a further engine to power the tractor wherein each said compartment is adapted to contain fuel for a corresponding single one of said two engines provided to power the tractor.

7. A tractor as claimed in claim 4, wherein said fuel tank is provided with a wash-bulkhead.

8. A tractor as claimed in claim 4, wherein said fuel tank is shaped on its bottom side to correspond to the adjacent upper configuration of said ground engaging wheels mounted on said single axle.

9. A tractor as claimed in claim 8, wherein, as seen in plan view, said fuel tank extends substantially only as far forwardly with respect to the intended direction of forward travel of the tractor as the front portions of said ground engaging wheels mounted on said single axle.

10. A tractor as claimed in claim 9, wherein the top of said fuel tank is substantially horizontally disposed.

11. A tractor as claimed in claim 10, wherein a driving seat and associated control members are arranged on top of said fuel tank.

12. A tractor as claimed in claim 11, wherein said driving seat is positioned in a countersunk depression provided in said fuel tank at a location substantially in register with a vertical plane of substantial symmetry of the tractor.

13. A tractor as claimed in claim 1, wherein said driving seat is selectively movable about an upwardly extending axis beneath said seat whereby it may be positioned to face either forward or to the rear.

14. A tractor as claimed in claim 4, wherein said fuel tank comprises at least one portion which is displaceable relative to a further adjacent portion thereon.

15. A tractor as claimed in claim 14, wherein said displaceable fuel tank portion is mounted relative to said further portion whereby upon effecting such displacement, the over-all length of said major dimension of the fuel tank is reduced.

16. A tractor as claimed in claim 4, wherein said fuel tank has a volumetric capacity of substantially twelve hundred liters.

17. A tractor of at least 100 H.P. for long extended agricultural operation remote from fuel sources which comprises a frame, at least one engine carried by said frame, ground engaging wheels mounted to extend outwardly on opposite sides of said frame to support said frame from a front axle and rear axle connected to said frame, said ground engaging wheels being mounted on at least one of said axles in a row, said row comprising at least two ground engaging wheels at each side of said frame, at least a portion of said ground engaging wheels operatively connected to said engine, at least one high capacity fuel tank extending outwardly on each of its lateral sides beyond said frame, substantially all of said fuel tank being disposed vertically above said row of said ground engaging wheels on each side of said frame, the major dimension of said fuel tank being disposed substantially perpendicular to the longitudinal axis of the tractor, the bottom of said tank having a configuration whereby it is closely adjacent throughout to the upper configuration of said ground engaging wheels thereunder and the top of said fuel tank being substantially horizontal on its lateral sides where it extends beyond said frame, and a lifting device mounted on said frame to extend to the rear of said tractor.

18. A tractor as claimed in claim 17, wherein a driver's seat is arranged immediately above the top of said fuel tank, the relationship between said driver's seat and said lifting device being such that an operator in said driver's seat is provided with an unobstructed view of implements mounted on said lifting device.

* * * * *